Feb. 19, 1924.
D. S. KROHN
1,484,033
SPINDLE BODY BOLT AND MOUNTING THEREFOR
Filed April 16, 1923
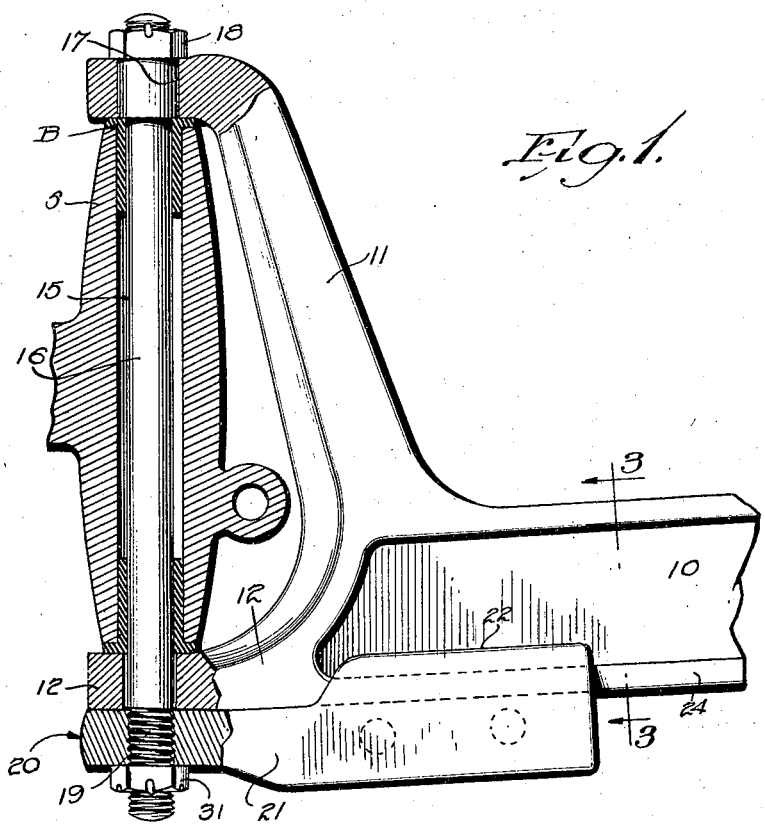
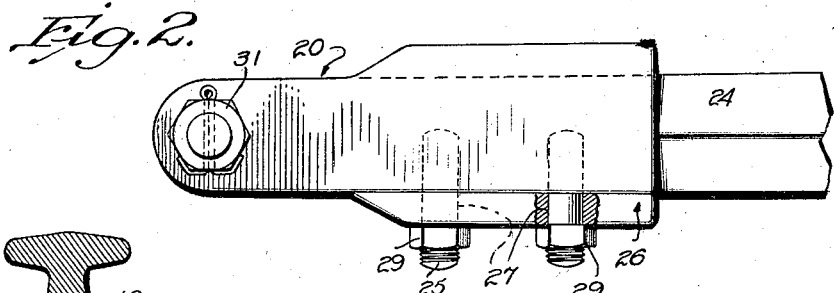
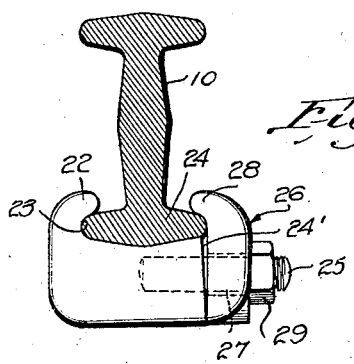
Inventor
DEWEY S. KROHN
By Watson E. Coleman
Attorney Patented Feb. 19, 1924.

1,484,033

UNITED STATES PATENT OFFICE.

DEWEY S. KROHN, OF CHICAGO, ILLINOIS.

SPINDLE-BODY BOLT AND MOUNTING THEREFOR.

Application filed April 16, 1923. Serial No. 632,504.

*To all whom it may concern:*

Be it known that I, DEWEY S. KROHN, a citizen of the United States, residing at Chicago, in the county of Cook and State of Illinois, have invented certain new and useful Improvements in Spindle-Body Bolts and Mountings Therefor, of which the following is a specification, reference being had to the accompanying drawings.

This invention relates to spindle body bolts and mountings therefor and more particularly to a spindle body bolt and mounting adapted for use for repairing and restoring worn spindle mountings.

An important object of the invention is to provide a device of this character which may be readily applied to an axle to replace the ordinary spindle bolt when the openings through which the spindle bolt is ordinarily directed have become worn, so constructed that the ordinary spindle may be employed therewith.

As is well known to those familiar with the construction of a certain class of light motor vehicles, the front axle thereof is provided at its ends with forks affording vertically spaced arms through which is directed a bolt upon which the steering spindles and the front wheels are mounted. In the original mounting the bolt is directed through the uppermost arm and threaded into the lowermost arm. In use, due in some instances to binding of the spindle body upon the bolt or to loosening of the securing elements of the bolt, the bolt rotates in its mountings with the result that the threads of this lower arm become worn and finally will not hold the bolt against rotation. It will be obvious that the bolt, once free to rotate, will wear the mounting openings of the arms to enlarge the same with the result that a considerable throw of the front wheels is caused which if continued will cause operation of the vehicle to become extremely costly in the matter of tires for such front wheels. In endeavoring to overcome this the opening of the upper arm is often reamed out and that of the lower arm rethreaded to a larger size. This necessitates the use of a bolt of larger diameter and furthermore the rethreading of the opening of the lower arm so weakens this arm so as to render breakage thereof a likelihood. By the use of a device constructed in accordance with my invention the rethreading of the lower arm is eliminated and furthermore the use of a bolt, the body of which is of a diameter equal to the bolt usually provided, is permitted, the advantage of this latter feature will immediately become obvious when it is pointed out that these spindle bodies are provided in their ends with bushings fitting the bolts and accordingly when a larger bolt is employed it is necessary either to ream these bushings to fit such bolt or to provide an entirely new bushing for the spindle body.

The above and other objects I accomplish by the construction shown in the accompanying drawings, wherein for the purpose of illustration is shown a preferred embodiment of my invention and wherein:—

Figure 1 is a front elevation partially in section showing repair parts constructed in accordance with my invention applied to an axle;

Figure 2 is a bottom plan view thereof; and

Figure 3 is a section on the line 3—3 of Figure 1.

Referring now more particularly to the drawings, the numeral 10 indicates a vehicle axle, provided at its end with upper and lower spindle bolt arms 11 and 12 having vertically aligned openings 13 and 14 formed therein. In the original construction of the axle these openings 13 are of the same size and the opening 14 of the lower arm 12 is screw-threaded for the reception of the lower end of the spindle body bolt. These openings having become worn, for the reasons above set forth, I provide a body bolt 15, the body portion 16 of which is of the same size as the spindle bolt ordinarily employed. The upper end of this body portion is enlarged, as indicated at 17, for a distance equal to the thickness of the upper arm 11, the upper end of this enlargement being provided with the usual hexagon head 18. With the exception of the fact that this bolt is of greater length than the original bolt employed and has the enlargement 17 formed thereon, the construction thereof is identical with that of the original bolt. The excess length of the bolt is provided so that the threaded lower end 19 thereof will project through the lower arm 12 a sufficient distance to permit its engagement in a mounting 20 provided therefor. The mounting 20 comprises a plate 21 abutting and conforming to the shaping of the lower surface of the axle and the lower arm 12. The axle engaging portion of the plate 21 is provided at one side thereof with an upstanding flange 22 having a slot 23 formed therein for the reception of one side edge of the flange 24 of the axle. The plate, reckoned from the base of the groove or slot 23 to the opposite edge face 24 thereof, is of a width slightly less than the width of the flange of the axle. In this face are engaged stud bolts 25 and a clamping plate 26 is provided having openings 27 formed therein for the reception of the stud bolts 25 and having at its upper end a flange 28 adapted to abut and clampingly engage over the opposite edge of the axle flange 24 from the flange 22 of the main plate 21. The openings 27 are of a size permitting a slight rocking movement of the plate 26 upon the studs and accordingly when the nuts 29 of the studs are tightened the plate 26 will take a bearing between the lower edge of the plate 21 and the edge of the flange 24 against which it bears, thus enabling a very rigid clamping of the plate 21 to the axle. The side of the plate 21 bearing the flange 22 will be disposed forwardly or at the forward side of the axle and accordingly the securing elements for this plate and by means of which the plate is clamped into position will be hidden from view and the accessory will not materially affect the appearance of the vehicle. The outer end of the plate 21 is provided with a threaded opening 30 aligning with the openings 13 and 14 and with which the threaded lower end of the bolt 15 engages. The bolt 15 will extend beyond the lower face of this plate sufficiently to permit the engagement therewith of a castellated nut 31.

It will be seen from the foregoing that by the use of a spindle body bolt and mounting therefor constructed in accordance with my invention, old and worn out axles may have the life thereof indefinitely extended and at the same time standard spindle bodies S and spindle body bushings B may be employed. It will furthermore be obvious that such a device may be very readily applied to a vehicle, the only operation upon the axle which is necessary being that of enlarging the upper opening 13 to the diameter of the enlarged section 17 of the bolt. Since many changes are possible in the construction and arrangement of the mounting plate I do not limit myself to such specific structure thereof except as hereinafter claimed.

I claim:—

1. In combination with an axle provided at its end with vertically spaced spindle bolt receiving arms having vertically aligned openings formed therein, a spindle bolt mounted in said openings and fitting the opening of the upper arm, and a plate secured to the axle and extending beneath the lower arm having a threaded opening formed therein aligned with the openings of said spindle arms, the lower end of said bolt being threaded and being engaged in the opening of the plate.

2. In combination with an axle provided at its end with vertically spaced spindle bolt receiving arms having vertically aligned openings formed therein, a spindle bolt mounted in said openings and having an enlargement fitting the opening of the upper arm, and a plate secured to the axle and extending beneath the lower arm having a threaded opening formed therein aligning with the openings of the spindle arms, said plate being formed in two separable sections clampingly engaging the axle, the lower end of the bolt being threaded and engaged through the opening of the plate.

3. In combination with an axle provided at its end with vertically spaced spindle bolt receiving arms having vertically aligned openings formed therein, a spindle bolt mounted in said openings, and a plate rigidly secured to the axle and extending beneath the lower arm and conforming to the shape thereof, said plate having a threaded opening formed therein aligned with the openings of the spindle arms, the lower end of the bolt being threaded and being engaged in the opening of the plate.

In testimony whereof I hereunto affix my signature.

DEWEY S. KROHN.